(12) United States Patent
Gebremeskel et al.

(10) Patent No.: US 10,339,749 B2
(45) Date of Patent: Jul. 2, 2019

(54) SYSTEM AND METHOD FOR PARKING VEHICLES USING A MOBILE COMPUTING DEVICE

(71) Applicant: RAPID LANE, LLC, San Francisco, CA (US)

(72) Inventors: Gritty T. Gebremeskel, San Francisco, CA (US); Binyam Haileselassie, San Francisco, CA (US); Marie Kamali, Hercules, CA (US); Yordanos Merawi, San Francisco, CA (US); Edward C. Singer, Jr., San Francisco, CA (US); Biruk W. Tadesse, Ssan Pablo, CA (US); Estifanos G. Wolde, San Francisco, CA (US)

(73) Assignee: Rapid Lane, LLC, San Francisco, CA (US)

( * ) Notice: Subject to any disclaimer, the term of this patent is extended or adjusted under 35 U.S.C. 154(b) by 0 days.

(21) Appl. No.: 15/392,819

(22) Filed: Dec. 28, 2016

(65) Prior Publication Data

US 2018/0182200 A1    Jun. 28, 2018

(51) Int. Cl.
| | |
|---|---|
| *G07F 17/00* | (2006.01) |
| *H04W 4/04* | (2009.01) |
| *G07F 17/24* | (2006.01) |
| *H04W 8/18* | (2009.01) |
| *H04W 4/24* | (2018.01) |

(Continued)

(52) U.S. Cl.
CPC ......... *G07F 17/0057* (2013.01); *E04H 6/422* (2013.01); *G06Q 10/025* (2013.01); *G07B 15/04* (2013.01); *G07C 9/00031* (2013.01); *G07F 17/24* (2013.01); *G08G 1/0969* (2013.01); *G08G 1/09685* (2013.01); *G08G 1/096816* (2013.01); *G08G 1/096861* (2013.01);

(Continued)

(58) Field of Classification Search
CPC ..... G07F 17/0057; G07F 17/24; E04H 6/422; E04H 6/426; G06Q 10/025; G07B 15/04; G07C 9/00031; G08G 1/142; H04W 4/04; H04W 4/24; H04W 8/183
USPC ........................................... 340/5.6
See application file for complete search history.

(56) References Cited

U.S. PATENT DOCUMENTS

| | | | |
|---|---|---|---|
| 2014/0232518 A1* | 8/2014 | Stoehr ................. | G07B 15/04 340/5.6 |
| 2014/0285361 A1* | 9/2014 | Tippelhofer .......... | G08G 1/143 340/932.2 |

(Continued)

*Primary Examiner* — Hirdepal Singh
(74) *Attorney, Agent, or Firm* — Ray K. Shahani, Esq.

(57) ABSTRACT

A system and method for parking vehicles using a mobile computing device in which a network of garages and a network of valets are created so that a user can search a given geographical location for a set of parking options including self parking destinations and prices and valet destinations and prices, the user can select an option, upon arrival at the location the user scans an In-App QR code which checks the balance in a user's credit account, the credit account is replenished if necessary, the estimated parking charge is automatically deducted from the user's account and distributed to the garage and the management accounts, and when the user departs the parking location or is picked up by the valet at time desired by the user, the system closes the parking session, calculates the total charges due, deducts the additional charges from the user account and distributes the payment to the garage and the management service provider.

7 Claims, 13 Drawing Sheets

(51) Int. Cl.
*G06Q 10/02* (2012.01)
*G07C 9/00* (2006.01)
*E04H 6/42* (2006.01)
*G07B 15/04* (2006.01)
*G08G 1/0968* (2006.01)
*G08G 1/0969* (2006.01)
*G08G 1/14* (2006.01)
*H04M 15/00* (2006.01)
*H04W 4/02* (2018.01)

(52) U.S. Cl.
CPC ....... *G08G 1/096883* (2013.01); *G08G 1/144* (2013.01); *G08G 1/146* (2013.01); *G08G 1/148* (2013.01); *H04M 15/8033* (2013.01); *H04M 15/8044* (2013.01); *H04W 4/04* (2013.01); *H04W 4/24* (2013.01); *H04W 8/183* (2013.01); *H04W 4/02* (2013.01)

(56) References Cited

U.S. PATENT DOCUMENTS

| | | | |
|---|---|---|---|
| 2015/0025947 A1* | 1/2015 | Dutta | G06Q 10/02 705/13 |
| 2015/0219463 A1* | 8/2015 | Kang | G08G 1/143 701/117 |
| 2016/0163121 A1* | 6/2016 | Martin | G06Q 10/02 705/13 |
| 2016/0203650 A1* | 7/2016 | Stanford | G07B 15/02 705/13 |
| 2016/0327949 A1* | 11/2016 | Wilson | G05D 1/0246 |
| 2017/0039779 A1* | 2/2017 | Vander Helm | G07B 15/02 |
| 2017/0103585 A1* | 4/2017 | Hoffman | G07B 15/02 |
| 2017/0140586 A1* | 5/2017 | Volz | G06Q 30/00 |
| 2017/0191848 A1* | 7/2017 | Jones | G01C 21/3685 |
| 2017/0200365 A1* | 7/2017 | Baker, Sr. | G08G 1/017 |
| 2017/0329346 A1* | 11/2017 | Latotzki | B62D 15/0285 |

* cited by examiner

SYSTEM AND METHOD FOR PARKING VEHICLES USING A MOBILE COMPUTING DEVICE

RELATED APPLICATIONS

None

FIELD OF THE INVENTION

The present invention is related to apps for mobile computing devices for finding, reserving and paying for vehicle parking.

BACKGROUND OF THE INVENTION

In modern cities where driving personal cars, trucks and other vehicles is permitted, parking is of major concern. Given environments with limited space for parking vehicles while not in use, properties dedicated to parking vehicles are prevalent in large cities. Parking lots, garages and other parking structures are often built under ground and above ground. Individual parking spaces are numbered, and access to the parking lot is either controlled with a gate or parking spaces are individually metered.

Parking lots, garages and other structures are optimally located in neighborhoods where parking demand is high. Often, however, available parking in these parking destinations is extremely limited, and this causes traffic on streets with street parking, traffic in and out of parking lots and garages, and even traffic within parking structures entering, exiting and looking for parking.

QR is an abbreviation for "quick response". A QR code is a type of matrix barcode or two-dimensional barcode, i.e., a machine-readable optical label that contains information about the item to which it is attached. QR codes are used in a variety of applications, from providing information about products, restaurants, etc. As an example, when a customer wishes to pay his or her bill at a restaurant, the customer launches a payment app on a mobile device. The restaurant generates a QR code on a bill or on a cash register. The customer scans the QR code and the mobile app initiates the financial transaction, i.e., funds are transferred from the User's financial account to the restaurant's financial account.

Existing mobile device parking app for finding, booking and paying for parking ParkNow provides self-parking options, but no monthly or valet parking options. There is no way to reserve a valet, make on-demand payments to a pre-established financial account payment processor such as PayPal-brand or Braintree-brand financial transaction services, or generate in-app a QR code. https://park-now.com/

Existing mobile device parking app for engaging a valet LUXE doesn't offer reserved parking or generate in-app a QR code. http://www.luxe.com/home Existing mobile device parking app for self-parking PARKWHIZ doesn't offer valet service. There is no way to make on-demand payments to a pre-established financial account payment processor such as Paypal-brand or Braintree-brand financial transaction services or generate in-app a QR code. https://www.parkwhiz.com/

Existing mobile device parking app for self-parking SPOT HERO doesn't offer valet service. There is no way to make on-demand payments to a pre-established financial account payment processor such as Paypal-brand or Braintree-brand financial transaction services or generate in-app a QR code. https://spothero.com/

SUMMARY OF INVENTION AND ADVANTAGES

The present invention is a total solution to all of a User's parking needs found in one mobile computing device software application. When a User of the mobile app needs a valet or needs a parking garage in a city or a location where the User is local or is a guest and not familiar, the User can use a free or inexpensive downloadable mobile app. The service provides options for self parking garages or a personal valet to meet a User at the User's chosen location.

The steps taken by the User include:
1. Search
2. Select Price
3. Choose Valet or Self Parking, confirm and the User is instantly routed to the desired destination.

The User can set up their secure payment account and all of the User's transactions will be automatically deducted, with receipts and payment history stored and available for viewing in the mobile app. If the User's deposit account starts to run low and a User needs a valet or parking garage in a hurry, the User can credit the deposit account with one tap from the User's homescreen.

The mobile app will be a final stop because it answers all the User's parking needs on demand, on time and at the price selected by the User. The User controls their spending, not the app.

A very general synopsis of an embodiment of the mobile parking app of the present invention follows:
1. User downloads the Application
2. User creates a new secure account, password protected
3. User creates secure Financial Services (such as Paypal or Braintree brands) Account
4. User adds funds to Account
5. User searches for a Self Parking Garage or Valet to meet up a specific location
6. Users map loads Self Parking and Garage destinations on the Users map with pricing
7. User selects a location and pricing
8. User confirms selection
   A. Users App checks to ensure User has sufficient funds in their Account
   B. User is prompted to add funds if insufficient
9. User is routed via the inApp map to the selected location (only if sufficient funds are in Users' Account)
10. User arrives at the location
11. User scans an inApp QR Code
   A. Users App will process payment and remove funds for the parking service from the Users inApp Account
   B. Users Account is deducted the cost of the parking Service
   C. Funds are distributed to Administrator account and Garage/Self-Parking Accounts Benefits and features of the invention are made more apparent with the following detailed description of a presently preferred embodiment thereof in connection with the accompanying drawings, wherein like reference numerals are applied to like elements.

DETAILED DESCRIPTION OF THE PREFERRED EMBODIMENT

Figure 1A:
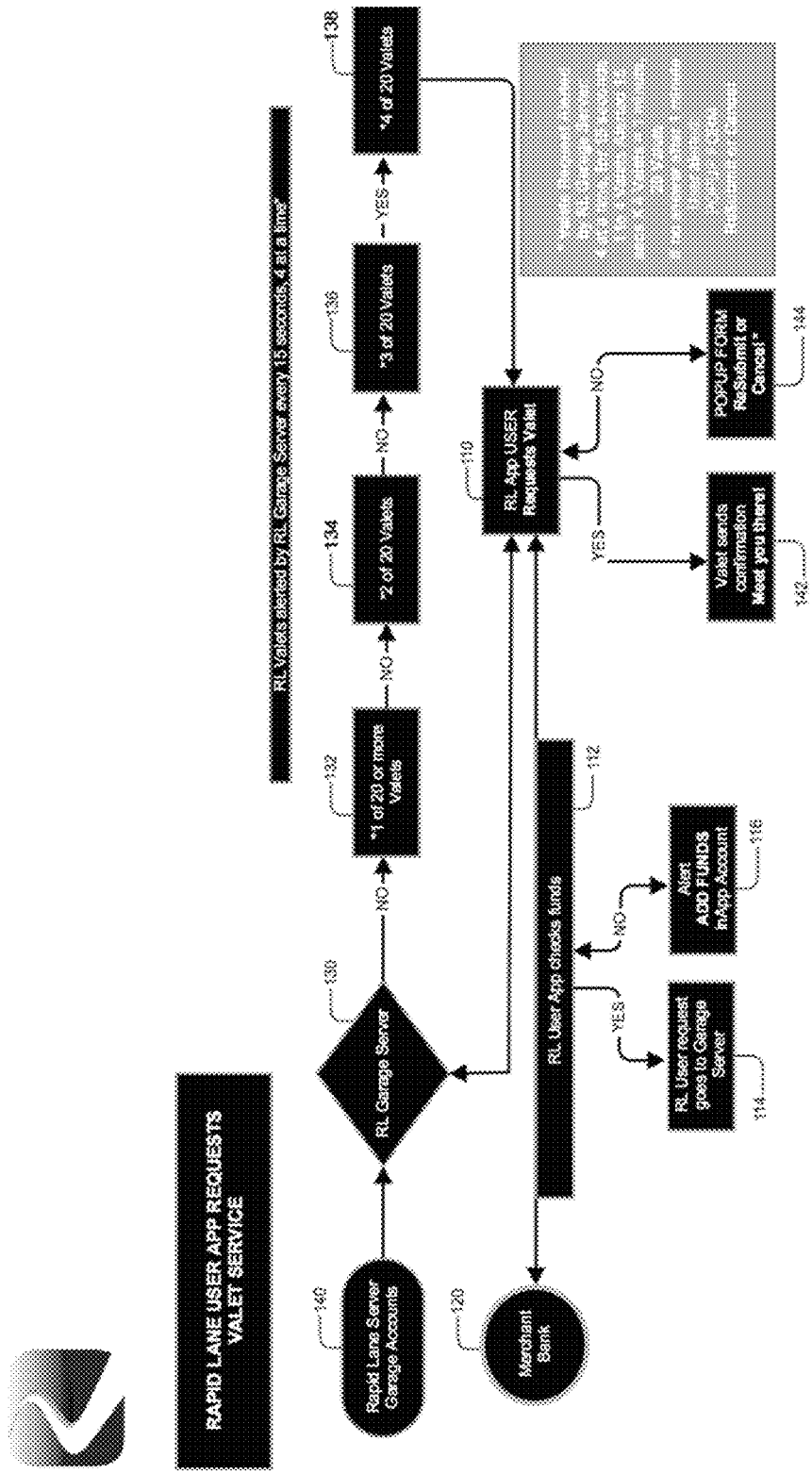
FIG. 1A is a representative flowchart showing a user request for valet services associated with the mobile application.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

The following is a more detailed description of an embodiment of the mobile parking app of the present invention:

1. User downloads the Application
2. User creates a new secure account, password protected
3. User creates secure Financial Account such as Paypal or Braintree brand Account
4. User adds funds to Account
5. User searches for a Self/Monthly Parking Garage or Valet to meet up a specific location [*GARAGE SERVER]
6. User's inApp GPS mapping loads Garage and Self-Parking destinations with pricing [*GARAGE SERVER]
7. User selects a location and pricing
8. User confirms selection
   A. Users App checks to ensure User has sufficient funds in their Account
   B. User is prompted to add funds if insufficient
9. User is routed via the inApp GPS mapping to the selected location (only if sufficient funds are in Users' Account)
10. Self/Monthly Parking—Routing Begins (User's inApp live GPS mapping) [*GARAGE SERVER]
11. Valet App confirms Users request and sends User an inApp message with contact info
   A. User is routed to destination
   B. Valet is routed to destination
   C. User and Valet are concurrently visible on inApp live GPS mapping
12. User arrives at the requested meeting location, option to tap "I'm here" which sends alert to Valet's App
   A. User's QR Code (screen) automatically pops up
13. Valet arrives at the requested meeting location, option to tap "I'm here" which sends alert to User's App
   A. Valet's QR Scanner (screen) automatically pops up
14. Valet scans User's QR Code [*GARAGE SERVER]
   A. Users App will begin transaction (pricing based on garage service selected by User)
15. Valet parks User's Car [*GARAGE SERVER]
   A. Both User and Valet have live, gps visual of locations wherein Valet has visual of Users location, User has visual of Valet, until car is parked via inApp live GPS map routing
   B. Pop Up Menu, Valet adds Garage Floor, #Space (parking info goes to Server, Valet Active)
   C. User receives inApp message, Name, Address and Phone of location where their car is parked
16. User request's car return [*GARAGE SERVER]
17. Valet App confirms Users request and sends User an inApp message with contact info [*GARAGE SERVER]
   A. Valet is routed to destination via live, gps visual of locations wherein Valet has visual of Users location and User has visual of Valet, until car is returned to User
   B. User and Valet are concurrently visible on inApp live GPS mapping
18. User arrives at the requested meeting location, option to tap "I'm here" which sends alert to Valet's App
   A. User's QR Code (screen) automatically pops up
19. Valet arrives at the requested meeting location, option to tap "I'm here" which sends alert to User's App
   A. Valet's QR Scanner (screen) automatically pops up
20. Valet scans User's QR Code [*GARAGE SERVER]
   A. Users Account is deducted the cost of the parking Service
21. End transaction
   A. User receive's inApp receipt via Account History
22. Server stores completed service info [*GARAGE SERVER]
23. Funds are distributed to mobile parking App Administrator account and Garage/Self-Parking Account via Financial Account such as Paypal or Braintree brand Account [*GARAGE SERVER] Garage Server is sending, receiving data information to and from User and Valet.

FIG. 1A is a representative flowchart showing the processing of a User request for Valet services associated with the mobile application system 100. In an initial step, a user of the mobile device software application for parking 100 of the present invention initiates a request for a valet 110. This request initiates step 112 in which the system 100 checks the amount of funds held by the Merchant Bank 120. If there are sufficient funds to complete the User request, the request goes to the Garage server 130 in step 114. If there are insufficient funds in the Merchant Bank, the system 100 issues an alert 116 to the User to add funds to the User's in-app account. Once the account is funded, the User request goes to the Garage server 130 in step 114.

Garage server 130 is part of a network of servers controlled by the mobile application system 100 server 140. The user request is directed to Garage server 130 which alerts Valets to the request. Garage server 130 sends bursts of alerts to the Valets at the rate of 4 simultaneous alerts every 15 seconds. Thus, in a typical burst of alerts, a first Valet might not confirm the request as shown in step 132, a second Valet might not confirm the request as shown in step 134, a third Valet might not confirm the request as shown in step 136 but a fourth Valet might confirm the request as shown in step 138. If no valet confirms the request, a second burst of 4 alerts is broadcast to Valets by the Garage server 130, and the cycle continues for up to 1 minute. When a Valet confirms the User request, the Valet sends aa confirmation with a message such as "Meet you there" to the User in step 142. However, if there is no Valet available to confirm the user request even after 1 minute, or more or less as determined by a User's preferences, the User receives a Pop-Up Form in step 144 instructing the User to either "Re-Submit" or "Cancel" the request.

Figure 1B:
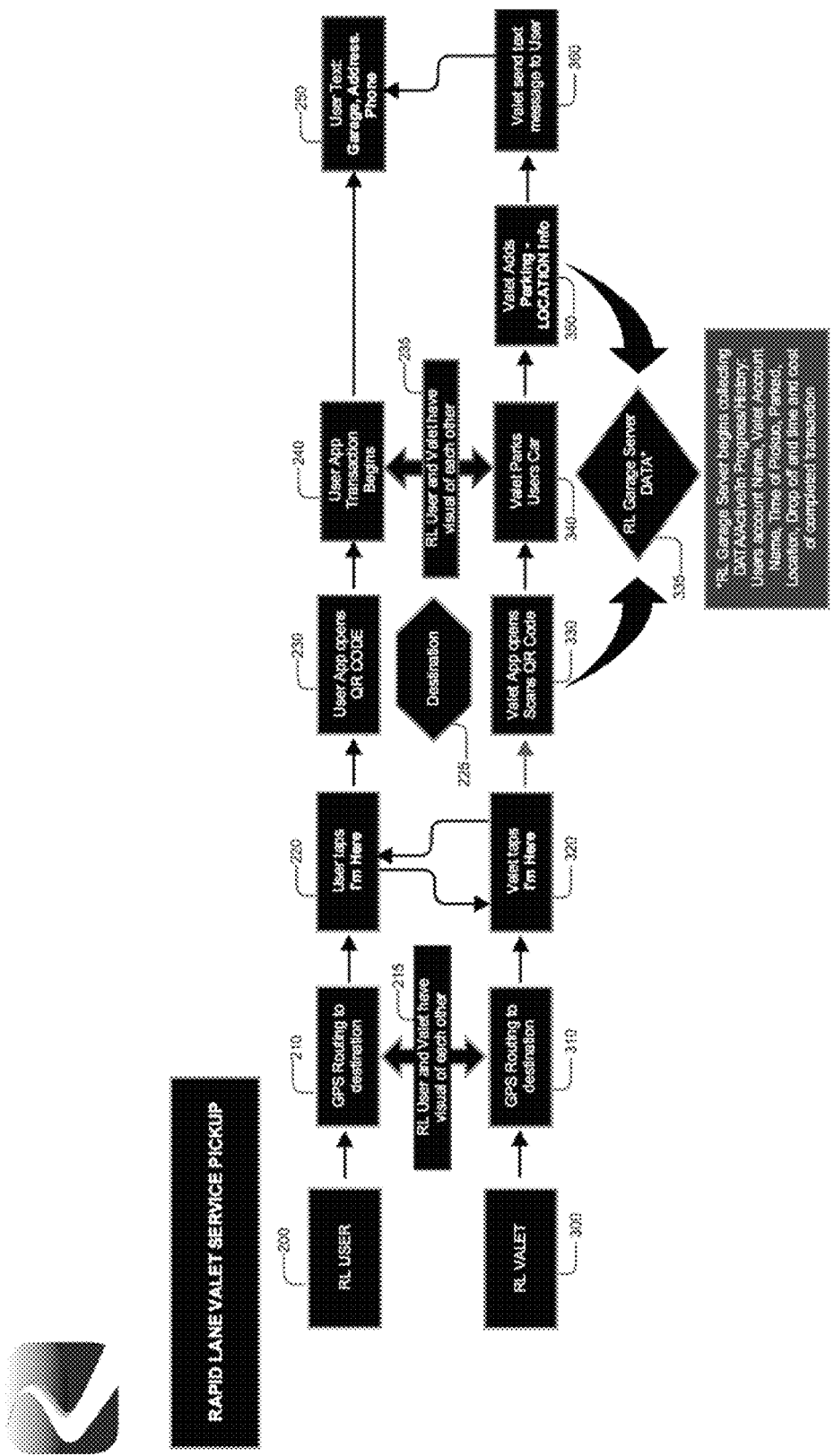
FIG. 1B is a representative flowchart showing valet pickup services associated with the mobile application.

FIG. 1B is a representative flowchart showing valet pickup services associated with the mobile application. In step 210 User 200 of the mobile application 100 uses GPS routing to arrive at a predetermined location. Simultaneously, the confirming Valet arrives at the designated location in step 310. Once the User 200 and the Valet 300 both have a visual of each other as shown at point 215, the User proceeds to confirm arrival through the app in step 220 while the Valet simultaneously confirms arrival through the app in step 320. Following the handshake between User 200 and Valet 300, the User app opens a unique QR Code in step 230. Step 240 is the beginning of the user app transaction, while at the destination 225 with the User 200 and Valet 300 in sight of each other as shown at point 235, the system app for the Valet 300 scans the QR code in step 330. At this point, the Garage server 130 begins collecting DATA/Active/In Progress/History as shown in step 335. Once Valet 300 parks the User's car in step 340, the Valet 300 can add the parking Location info to the app as shown in step 350. This data is also collected by the Garage server 130. Once the User 200 device transaction begins in step 240, then the User receives a text message confirming the garage, address, phone number and other contact details as shown in step 250. The User 200 will also receive a text message from the Valet 300 giving exact parking location info as shown in step 360.

Figure 1C:
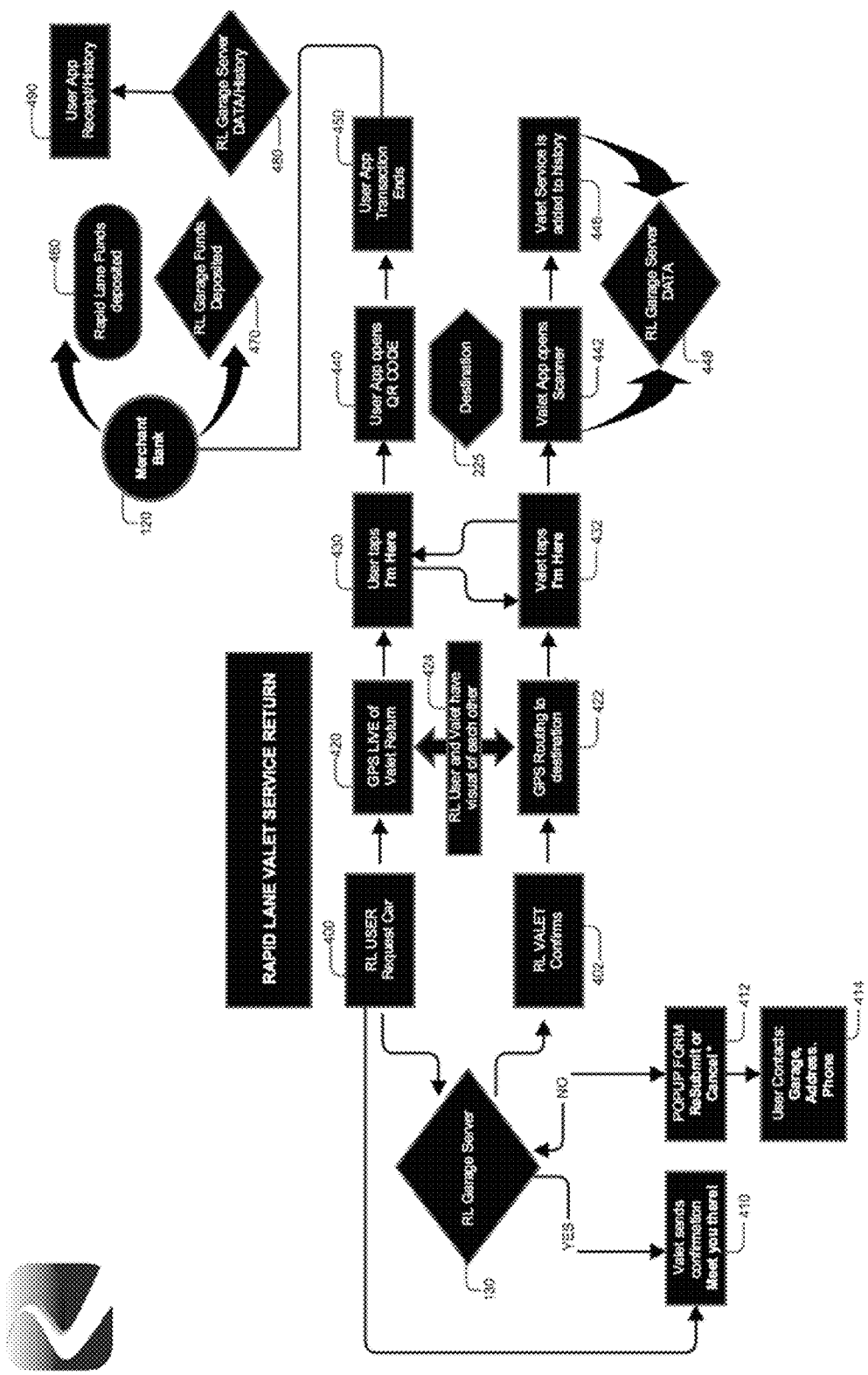
FIG. 1C is a representative flowchart showing valet return services associated with the mobile application.

FIG. 1C is a representative flowchart showing valet return services associated with the mobile application. When a user 200 makes a request for their car in an initiating step 400 the Valet 300 sends the User 200 a confirmation as shown in step 410. If the request fails, the User 200 receives a Pop-Up form 412 from Garage server 130 asking the User 200 to either Re-Submit the request or Cancel the request and the User 200 is provided with the Garage, address and phone number data as shown in step 414. When the handshake between the Garage server 130 and confirmation step 402 by the Valet 300, the User 200 is guided by live GPS guidance 420 as the Valet 300 is guided by GPS routing in step 422 to the pick-up Destination 225. A Visual is established between User 200 and Valet 300 at point 424. Once User 200 and Valet 300 each separately taps the "I'm Here" icon on their device as shown in steps 430 and 432, respectively connection is established between the mobile devices. At that point, User 200 opens the QR Code in step 440 thus allowing Valet 300 to scan the QR Code in complimentary step 442. The Valet 300 service log is updated in step 446 while the QR Code data as well as updated service log data are retained by Garage server 130 in step 448. Once the user opens its QR Code in step 440 the User 200 mobile app Transaction with the Merchant Bank 120 ends in step 450. Once the Merchant Bank 120 transaction closes, the Merchant Bank 120 pays out earned commission and/or fees to the mobile app administrator in step 460 and the funds belonging to the system Garage 130 receives are deposited in step 470. Finally, Garage 130 server data is updated in step 480 and an invoice is generated and transmitted to the User 200 app from the Garage 130 in step 490.

Figure 2A:
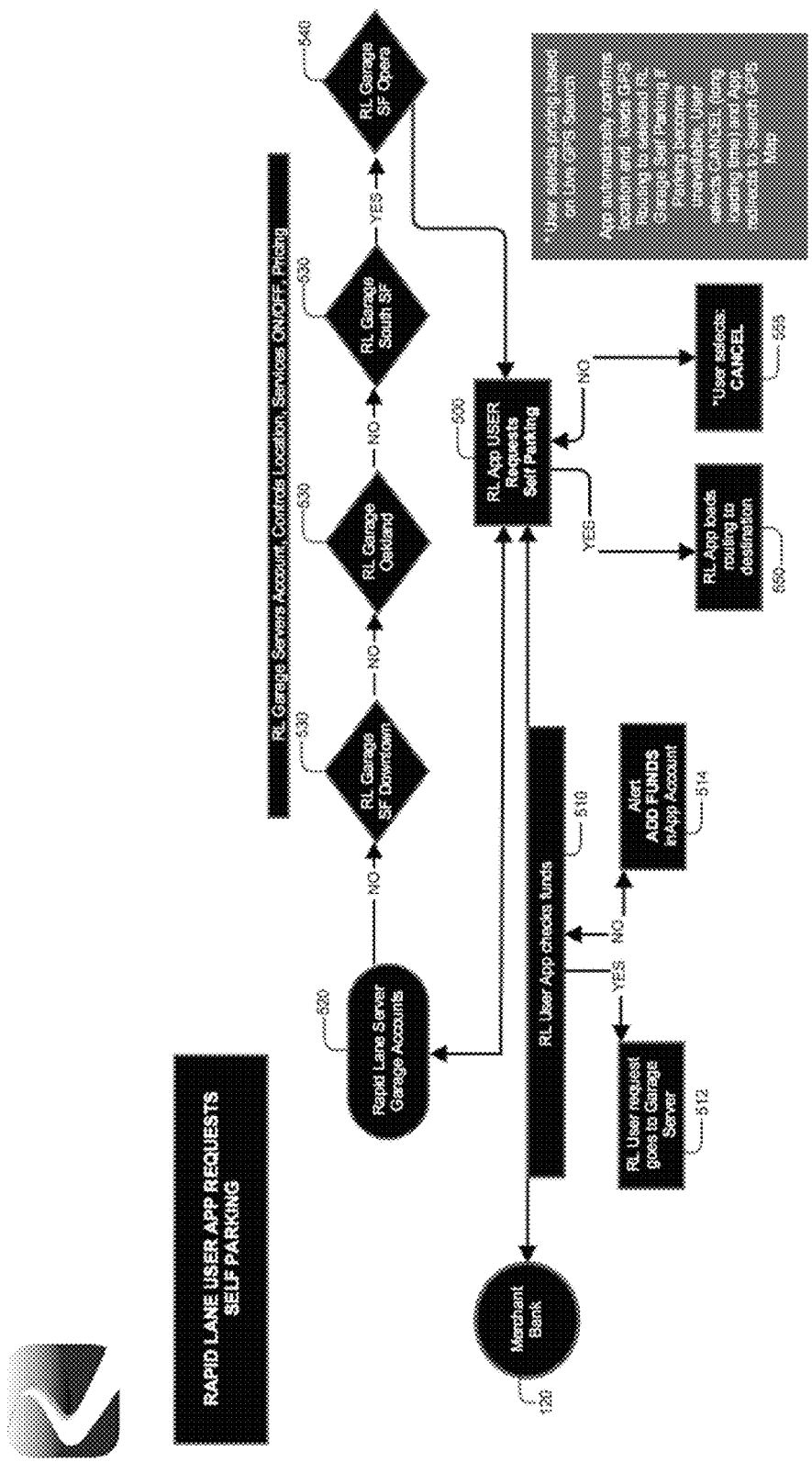
FIG. 2A is a representative flowchart showing a user request for self parking services associated with the mobile application.

FIG. 2A is a representative flowchart showing a user request for self parking services associated with the mobile application. In this script, a User 200 requests Self Parking in an initiating step 500. The mobile device software application for parking 100 of the present invention communicates with the Merchant Bank 120 in step 510 to check the available User 200 funds. If there are sufficient funds for the Self-Parking experience requested, the User request is transmitted to the Garage 130 server in step 512. If there are insufficient funds in the User's account at the Merchant Bank 120, the User 200 receives an Alert to "Add Funds" to the User's app account.

When the User requests Self-Parking in step 500, the mobile device software application for parking 100 of the present invention accesses the Garage Accounts server in step 520. Based on the criteria entered by the User 200, the mobile device software application for parking 100 communicates with the Garage accounts 530 and the mobile device software application for parking 100 of the present invention selects a Garage that satisfies the User's criteria such as in step 540. Once the User 200 selects a Garage such as in step 540, then the mobile device software application for parking 100 of the present invention will load the routing to the Self-Parking Destination in step 550. Thus, the User 200 can select a pricing based on Live GPS Search capability of the mobile device software application for parking 100 of the present invention which automatically confirms location and loads GPS Routing data to selected Garage that provides Self-Parking services. If parking is unavailable, the User can select "Cancel" in step 555 and the mobile app 100 will direct the User 200 to search GPS Map.

Figure 2B:
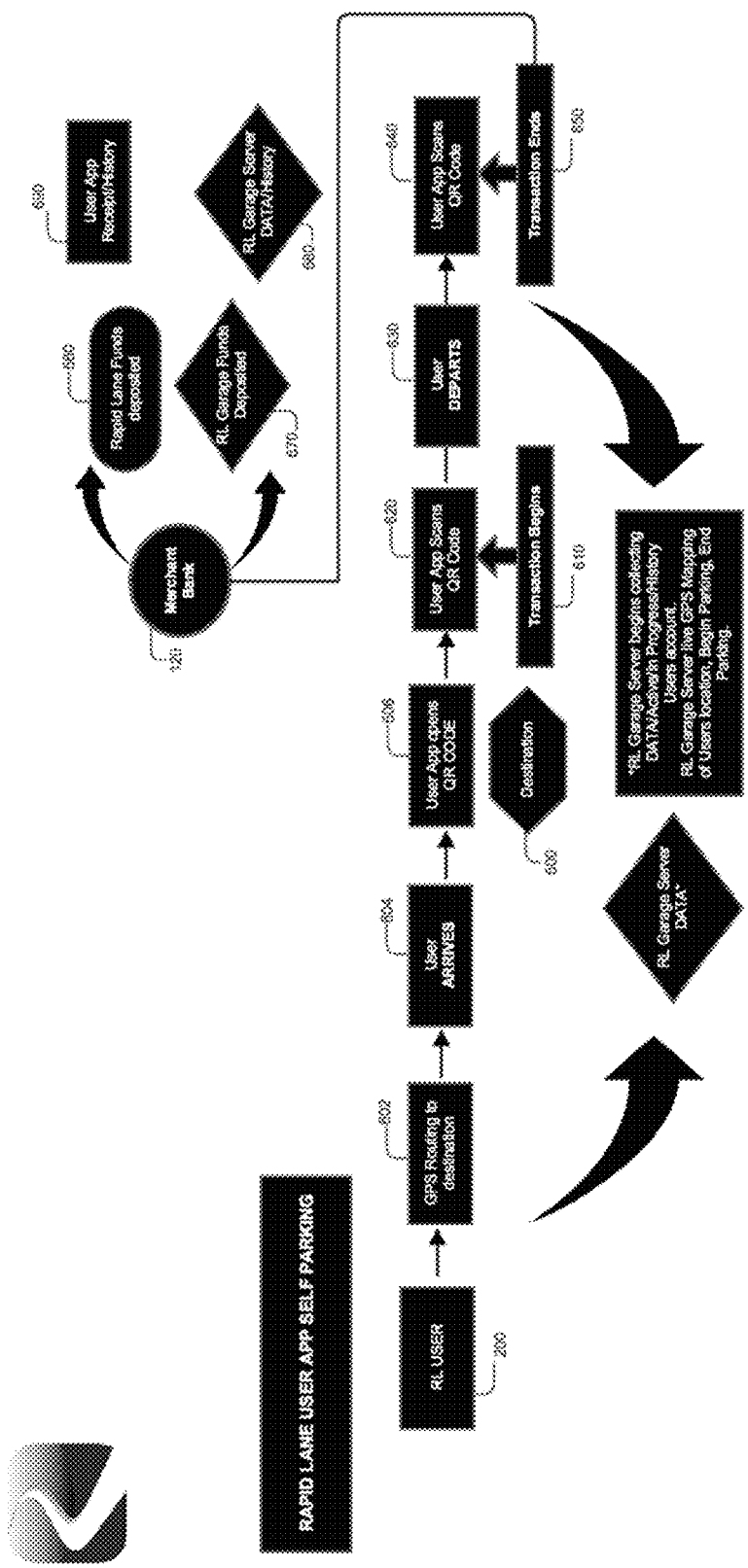
FIG. 2B is a representative flowchart showing self parking services associated with the mobile application.

FIG. 2B is a representative flowchart showing self parking services associated with the mobile application. In one embodiment of the Self-parking script for the mobile device software application for parking 100 of the present invention, a system User 200 uses in-app GPS Routing in step 602 to find a Self-parking location. The User then arrives at the Self-Parking Destination 600 as shown in step 604. The User's app opens a QR Code 606. A Transaction begins in step 610 when the User app scans the QR Code in step 620. After the User departs from the Self-parking facility in step 630, the User returns and scans the QR Code again in step 640. When the Transaction ends in step 650 at which time the Merchant Bank 120 causes the deposit of fees and commission funds to the account for the administrator of the mobile device software application for parking 100 of the present invention in step 660, and the Merchant Bank 120 deposits funds into the account for the Garage or other Self-Parking Destination 600. Finally, the Garage server data is updated and the User 200 receives a Receipt/History update as shown in step 690.

Figure 3:
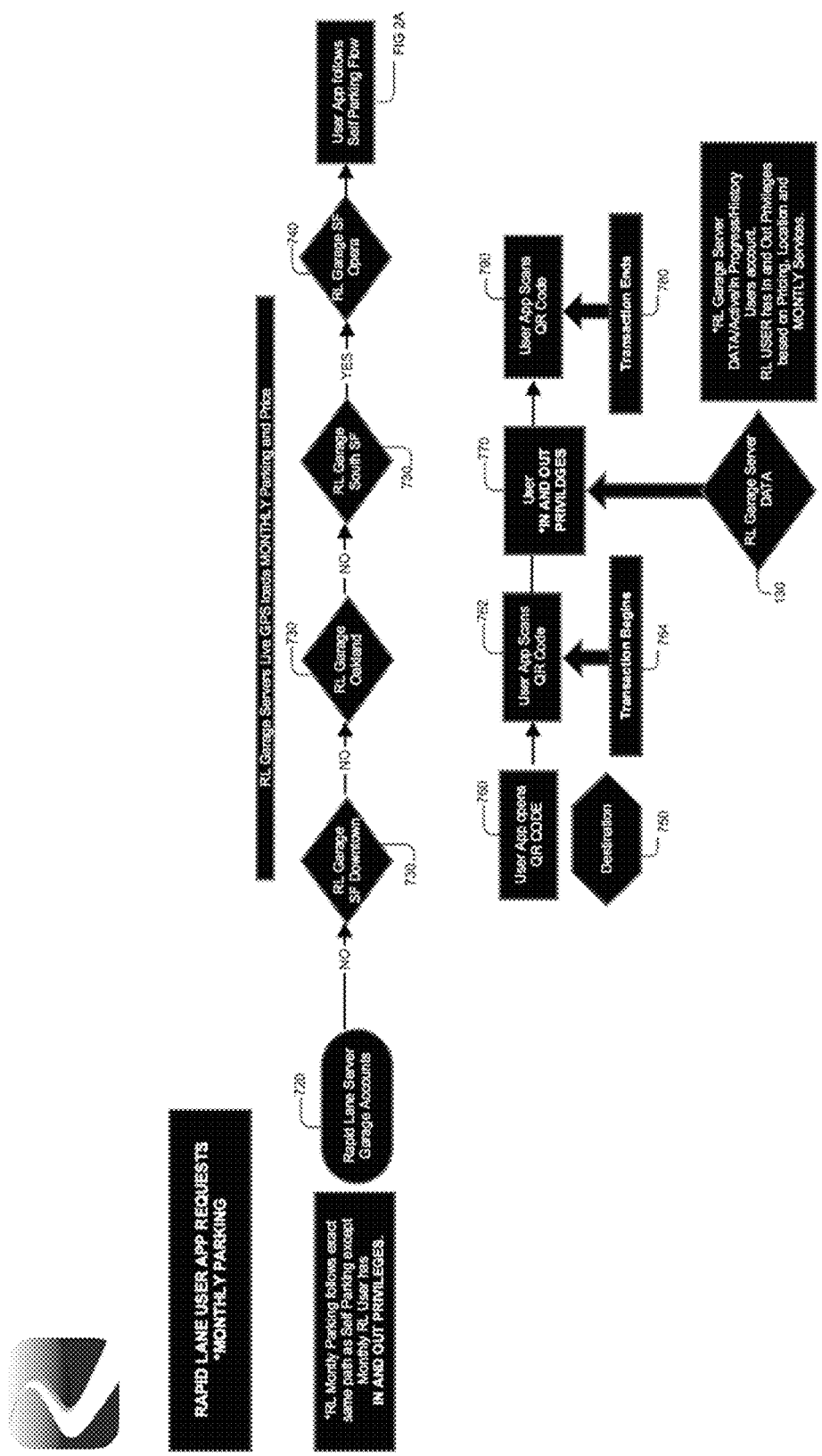
FIG. 3 is a representative flowchart showing a user request for monthly services associated with the mobile application.

FIG. 3 is a representative flowchart showing a user request for monthly services associated with the mobile application. In an embodiment of the present invention, the path followed by the User 200 using the Monthly-Parking option of the mobile device software application for parking 100 of the present invention is similar to the path followed for Self-Parking. Important differences between the Monthly-Parking option and occasional Self-Parking are that the Monthly-Parking User 200 of the mobile device software application for parking 100 of the present invention has unlimited "IN AND OUT PRIVILEGES", timing of transaction billing, etc.

When the User 200 has entered the Monthly-Parking mode, the mobile device software application for parking 100 of the present invention accesses the Garage Accounts server in step 720. Based on the criteria entered by the User 200, the mobile device software application for parking 100 communicates with the Garage accounts 730 and the mobile device software application for parking 100 of the present invention selects a Garage that satisfies the User's criteria such as in step 740. Once the User 200 selects a Garage for Monthly-Parking services such as in step 740, then the mobile device software application for parking 100 of the present invention will load the routing to the Monthly-Parking Destination 750. Thus, the User 200 can select a pricing based on Live GPS Search capability of the mobile device software application for parking 100 of the present invention which automatically confirms location and loads GPS Routing data to selected Garage providing Monthly-Parking services.

Upon arriving at the Destination for Monthly-Parking, the User app opens a QR Code as shown in step 760. At this point, the User 200 mobile device app 100 scans the QR Code in step 762 which is beginning of the Transaction as shown in 764. The Garage server 130 then provides the User 200 with "IN AND OUT PRIVILEGES" shown at 770. Upon leaving the Monthly-Parking Garage, the Transaction ends 780 at the point the User 200 app scans the QR Code shown at point 790. In the present embodiment, the system Garage server 130 generates and keeps Active/In Progress History data related to a User's account. The User 110 has In and Out privileges based on Pricing, Location and MONTHLY Services selected by User 110.

Figure 4A:
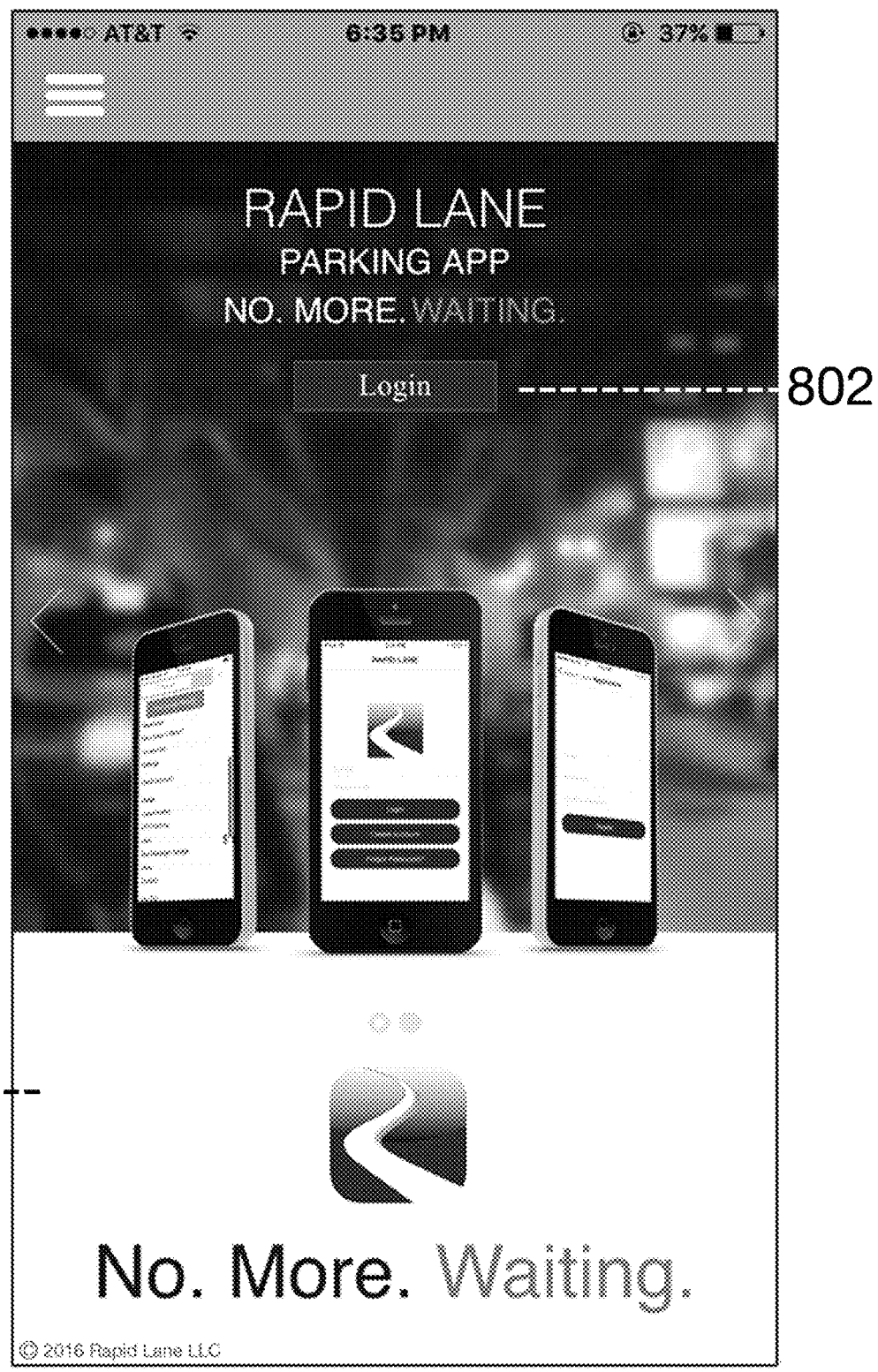
FIG. 4A is a representative screenshot showing a Homepage/Company Website for the mobile device parking application of the present invention.

FIG. 4A is a representative screenshot showing a Homepage/Company Website 800 for the mobile device parking application 100 of the present invention. From the Homepage, a User can tap the Login button 802 to log into the mobile app 100.

Figure 4B:
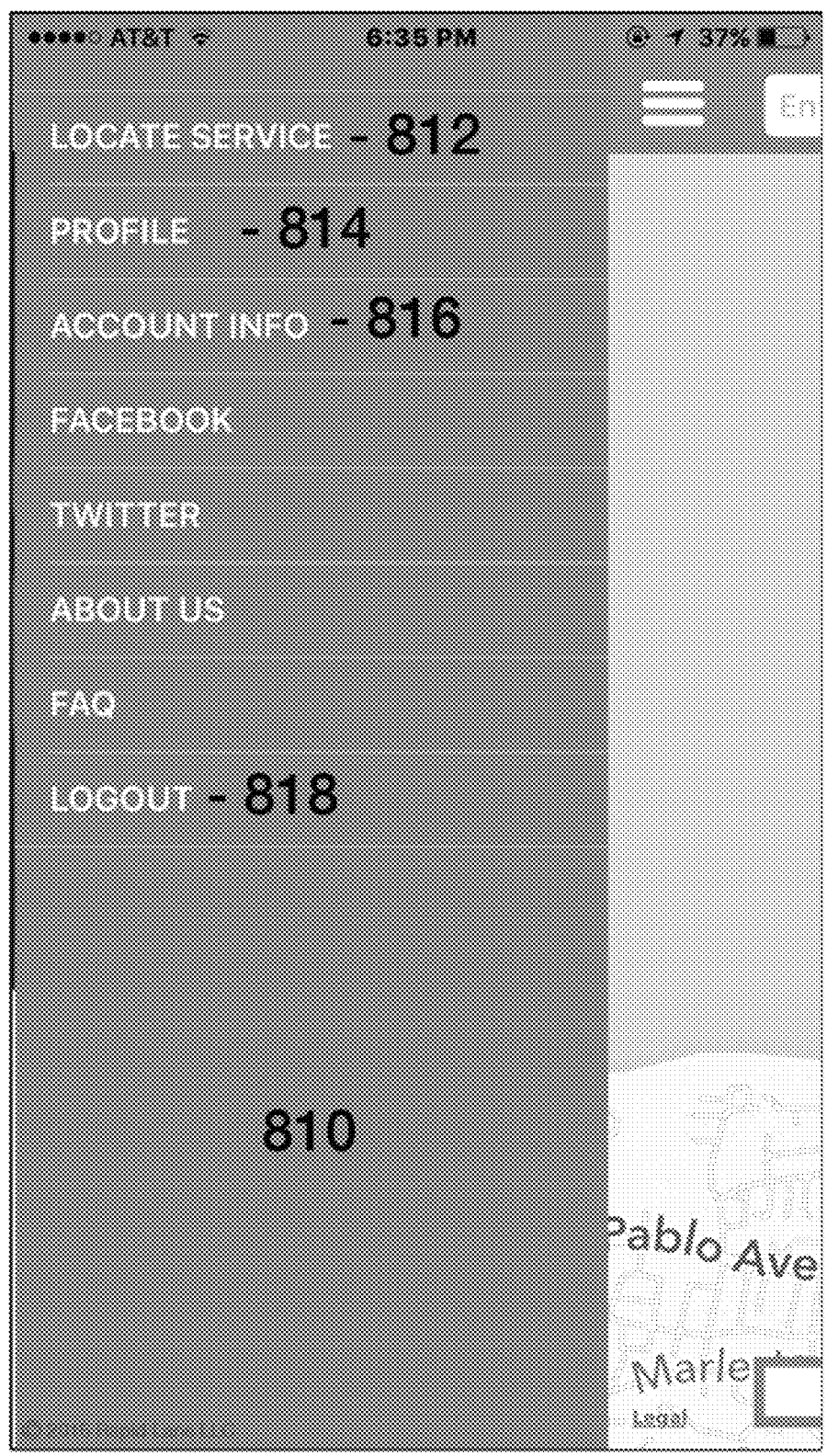
FIG. 4B is a representative screenshot showing a Main Menu for the mobile device parking application of the present invention.

FIG. 4B is a representative screenshot showing a Main Menu 810 for the mobile device parking application 100 of the present invention. From the Main Menu 810, a user can navigate through the app 100 using the Locate Service button 812, the Profile button 814, the Account Info button 816, and Logout button 818. The Main Menu 810 also allows a User to link directly to his or her Facebook or Twitter accounts, obtain About Us info related to the Administrator and author of the app 100, and obtain answers to frequently asked questions or FAQs about the app 100.

Figure 4C:
FIG. 4C is a representative screenshot showing Garage Server data input for the mobile device parking application of the present invention.

FIG. 4C is a representative screenshot showing Garage server data input 820 for the mobile device parking application 100 of the present invention. In this screenshot, in the Manager Panel accessed via the Admin panel, the Garage is assigned a name via dialog box 822. The total number of parking places located in the Garage is entered in dialog box 824. When "Enable valet service" option button 826 is selected, a price for Valet service can be entered into dialog box 828. Likewise, when "Enable monthly service" option button 830 is selected, a price for Monthly service can be entered into dialog box 832 and when "Enable self parking service" option button 834 is selected, a price for Self-Parking service can be entered into dialog box 836. Additional data entry dialog boxes include an Address box 838, etc. When the Save button is selected, the data entered into or changed in the various dialog boxes is stored to the Garage server.

Figure 4D:
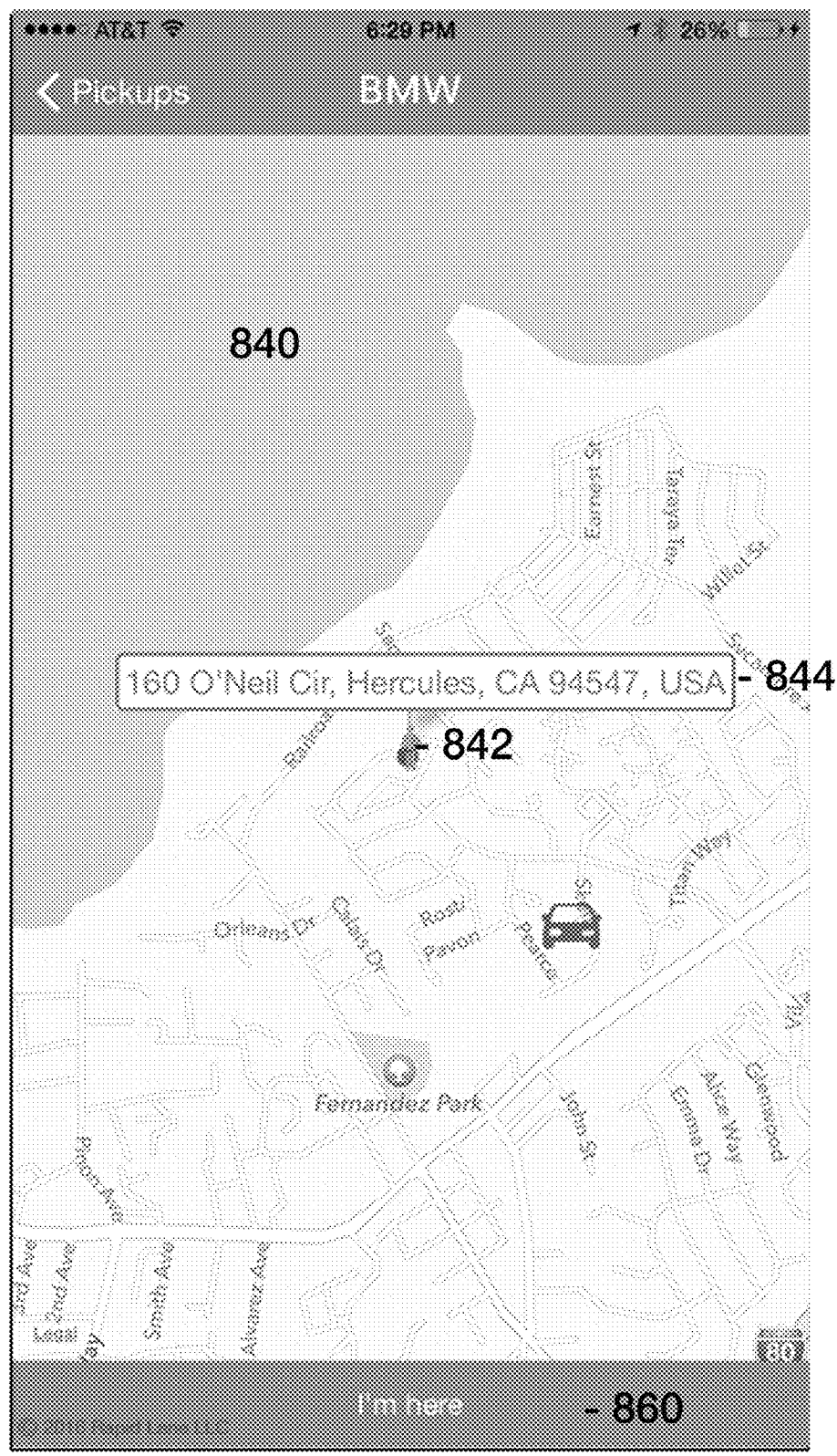
FIG. 4D is a representative screenshot showing an inApp Map of the user's location for the mobile device parking application of the present invention.

FIG. 4D is a representative screenshot showing an inApp Map screen 840 of the User's Location 842 for the mobile device parking application 100 of the present invention. The User's Location 842 is shown on the map, and the complete physical address of the Location 842 is shown in pop-up display box element 844. A banner with the words "I'm here" 846 is positioned at the bottom of the Map screen 840.

Figure 4E:
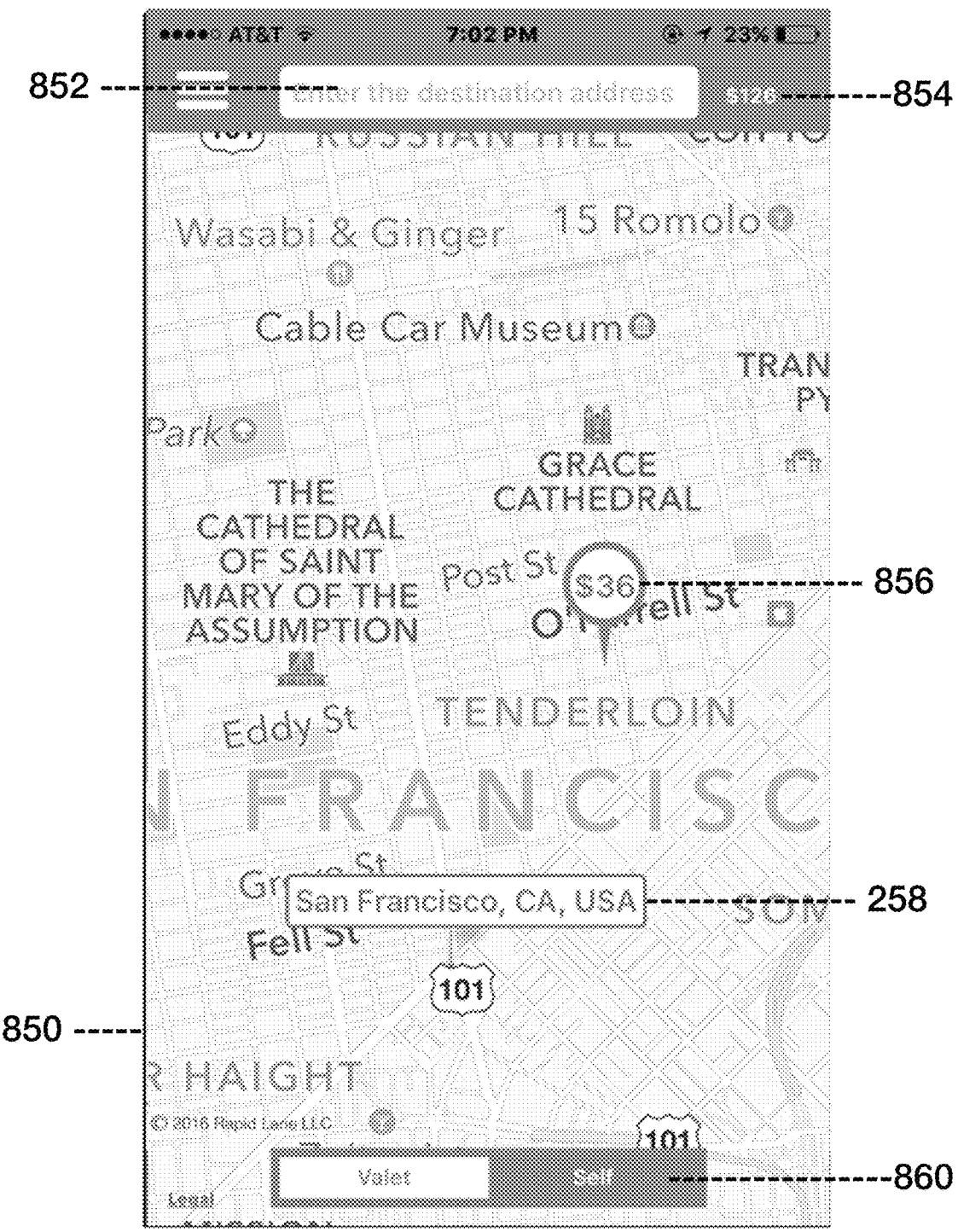
FIG. 4E is a representative screenshot showing a Request result map for the mobile device parking application of the present invention.

FIG. 4E is a representative screenshot showing a Request result map 850 for the mobile device parking application 100 of the present invention. At a dialog box in a top banner on the screen 852, a User can enter a different destination address. The User's balance remaining 854 in his or her Financial account is also shown in the upper banner. The location 856 of the selected Garage is shown with a pin icon with the price of the Garage also shown. The city where the Garage is located is printed in a banner box 258 midway down the screen 850. At the bottom of the screen 250, the User can switch from Valet service to Self-Parking service as desired using toggle dialog box 860.

Figure 4F:
FIG. 4F is a representative screenshot showing a GPS Guidance route to a Garage or Self-parking location for the mobile device parking application of the present invention.

FIG. 4F is a representative screenshot showing a GPS Guidance route 870 to a Garage or Self-parking location for the mobile device parking application 100 of the present invention. The User's balance remaining 854 in his or her Financial account is shown in the upper banner. The real-time location of the User 872 is shown at one end of the route. The location 856 of the selected Garage is shown with a pin icon and the price of the Garage also shown.

Figure 4G:
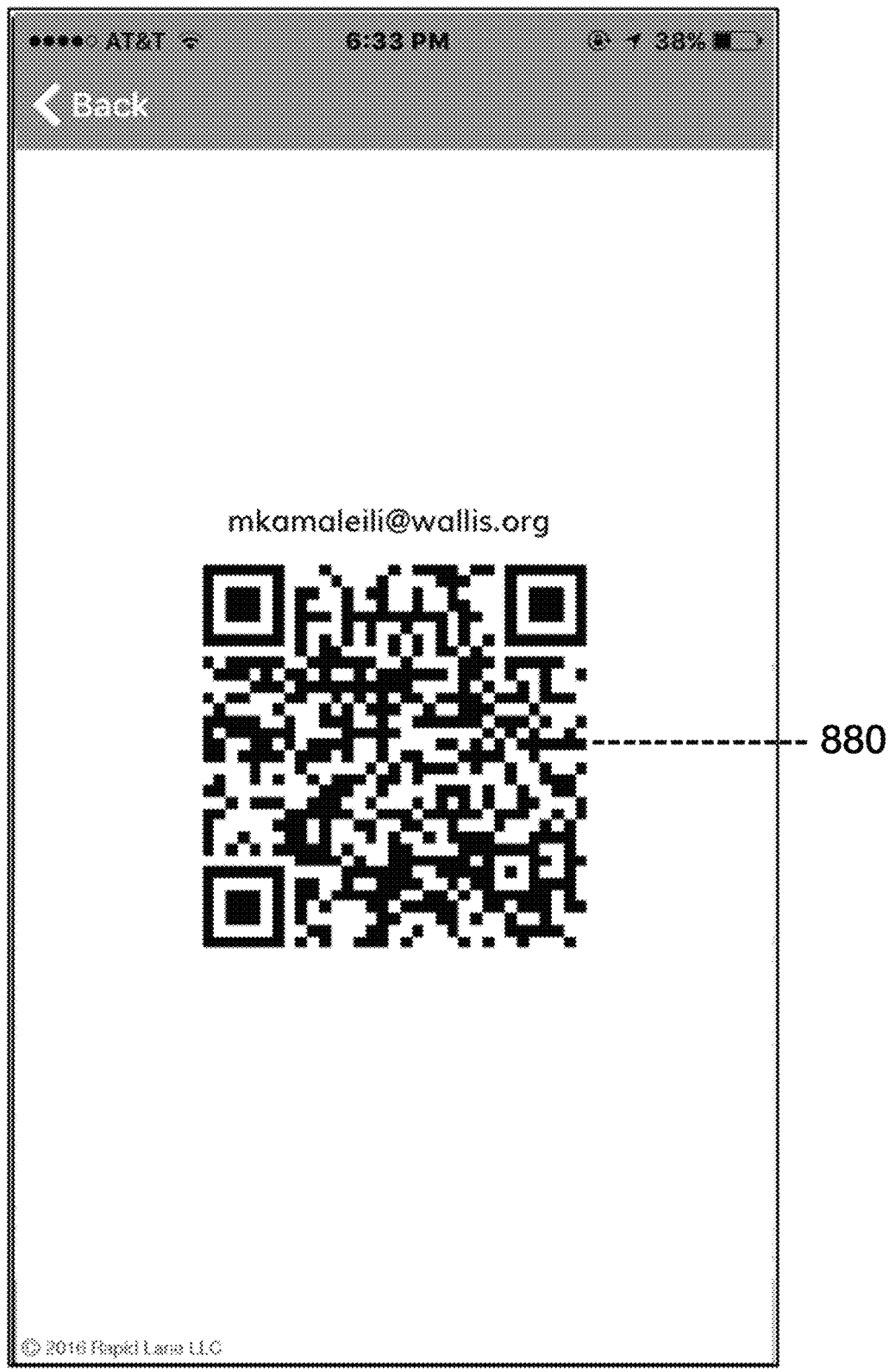
FIG. 4G is a representative screenshot showing a QR Code generated by the mobile device parking application of the present invention.

FIG. 4G is a representative screenshot showing a QR Code 880 generated by the mobile device parking application 100 of the present invention. As described above, when a user arrives at a location, the User generates a QR Code on a mobile device. The Valet scans the QR Code with the Valet's own mobile device and the financial transaction is initiated. Valet fees and garage costs are withdrawn from the User's Financial account and transferred to the Valet, Garage and the Administrator of the mobile parking app 100 of the present invention.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

We claim:
1. A Garage Server-based system for providing valet and self-parking services, the system comprising:
a network of participating Valets and Garages;
a network of independent Garage Servers wherein each independent Garage Server contains data related to a specific garage and participating Valets and their availability, pricing and address; and User and Valet software applications that operate on a mobile computing device, cell phone, tablet or laptop and perform the following functions:
- (A) provide an interface for a User and an interface for a Valet;
- (B) access real-time data from the Server;
- (C) allows a User to search for a Valet based on address, city or price for a particular day and time;
- (D) allows a User to summons a Valet to a particular location at a certain day and, time for a predetermined price;
- (M) upon receiving a request for Valet, sends alerts to a predetermined number of Valets simultaneously and regularly over a predetermined period of time;
- (J) sends a Valet confirmation to the User
- (F) receive a map and driving instructions to meet the Valet at the particular location;
- (P) once the User and Valet arrive at the particular destination and have a visual of each other, the User and the Valet are each provided with an "I'm here" electronic confirmation button to initiate the handover of the User's vehicle to the Valet;
- (G) initiate a financial transaction to pay for the Valet or other parking services from the User s inApp financial account;
- (Q) the User app generates and opens a QR Code which the Valet is able to scan;
- (R) allows the Valet to upload parking location information including but not limited to Garage, address, floor and space number to the Server;
- (S) sends the parking location information to the User;
- (T) when the User requests its vehicle be returned by the Valet, the Server sends the User a request confirmation from a Valet;
- (U) the Valet is provided with a mute and GPS guidance to a return destination requested by the User;
- (V) when the Valet and User arrive at the return destination and have a visual of each other, the User and the Valet are each provided with an "I'm here" electronic confirmation button to conclude the handover of the User's vehicle from the Valet back to the User;
- (W) the User app generates and opens a second QR Code which the Valet is able to scan;
- (X) the transaction on the User app ends, and User funds for payment of the parking services are dispensed from the User's financial account to the Valet account, the Administrator account and the Garage account;
- (Y) the Valet service data is added to the Server;
- (Z) the User is sent a receipt, and the User's history file in the Server is updated; and
- (H) conclude the transaction picked up by the Valet.

2. The system of claim 1 wherein the software application performs the following additional functions:
- (O) alerts the User to add funds to the User's inApp financial account when the account is insufficient to pay for a requested Valet parking service or continue a Valet parking service.

3. The system of claim 1 also for providing self-parking services wherein the network of independent Garage Servers also includes servers for participating Self-Parking destinations, the Server also contains data related to participating Self-Parking destinations and their availability, pricing and address and the software application perform the following additional functions;
- (AA) allows the User to perform live OPS search for Self-Parking destinations, and the Server provides a list of Self-Parking destinations and pricing from which the User may choose;
- (BB) when the User selects a Self-Parking destination, the Server for the Self-parking destination loads routing to the Self-Parking destination the User selected;
- (CC) check the funds present in User's financial account, and confirms funds availability to the Server;
- (DD) check the funds present in User's financial account, and if funds are not available, sends User an "add funds" Alert and allows User to add funds to Financial inApp account;
- (EE) if Self-Parking destination selected by User is unavailable, allows user CANCEL the destination and redirects User to perform another search GPS Map;
- (FF) upon arrival of the User at the Self-parking destination, the User app generates and opens a QR Code which the User is also able to scan, thus initiating a transaction;
- (GG) when the User departs the Self-Parking destination, allows the User to again scan the inApp generated QR Code to conclude the transaction with the User;
- (HH) when the transaction on the User app ends, User funds for payment of the parking services are dispensed from the User's financial account to the Administrator account and the Self-Parking destination account;
- (II) sends the User a receipt, and updates the Users history file in the Server; and
- (JJ) adds the Self-Parking service data to the Self-parking destination Server.

4. The system of claim 1 also for providing monthly self-parking services wherein the network also includes participating Monthly Self-Parking destinations, the network of servers for the Self-parking destinations also contains data related to participating Monthly Self-Parking destinations and their availability, pricing and address and the software application performs the following additional functions;
- (KK) allows the User to perform live GPS search for Monthly Self-Parking destinations, and the network of Servers provides a list of monthly Self-Parking destinations and pricing from which the User may choose;
- (LL) when the User selects a Monthly Self-Parking destination, the network Server loads routing to the Monthly Self-Parking destination the User selected;
- (MM) checks the funds present in User's financial account, and confirms funds availability to the Server,
- (NN) check the funds present in User's financial account, and if funds are not available, sends User an "add funds" Alert and allows User to add funds to Financial inApp account;
- (OO) upon arrival of the User at the Monthly Self-parking destination, the User app generates and opens a QR Code which the User is also able to scan, thus initiating a transaction;
- (PP) provides the User with "in and out privilege's";
- (QQ) when the User departs the Monthly Self-Parking destination, allows the User to again scan the inApp generated QR Code to conclude the transaction with the User;
- (RR) when the transaction on the User app ends, User funds for payment of the parking services are dispensed from the User's financial account to the Administrator account and the Monthly Self-Parking destination account;

(SS) sends the User a receipt, and updates the User's history file in the network Server; and (TT) adds the monthly Self-Parking service data to the network Server for the Self-Parking destination.

5. The system of claim 1 wherein the software application performs the following additional functions:

(UU) the network of independent Garage Servers sends bursts of alerts to Valets at the rate of about 4 simultaneous alerts about every 15 seconds.

6. The system of claim 5 wherein the software application performs the additional functions:

(VV) If no confirms the request, a second burst of about 4 alerts broadcast to Valets by the Garage Serves and the cycle continues for up to about 1 minute, or more less as determined by a User's preferences.

7. The system of claim 6 in the software application performs the following additional functions:

(WW) if after about 1 minute of sending bursts of alerts to Valets there is no Valet available to confirm the User request, or more or less as determined by a User's preferences, the User receives a Pop-Up Form instructing the User to either "Re-Submit" or "Cancel" the request.

* * * * *